United States Patent
Jensen

(10) Patent No.: US 7,980,293 B2
(45) Date of Patent: Jul. 19, 2011

(54) TWO FLUID THERMAL STORAGE DEVICE TO ALLOW FOR INDEPENDENT HEATING AND COOLING

(75) Inventor: Joseph M. Jensen, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 504 days.

(21) Appl. No.: 12/052,889

(22) Filed: Mar. 21, 2008

(65) Prior Publication Data

US 2009/0236071 A1 Sep. 24, 2009

(51) Int. Cl.
 *F28D 17/00* (2006.01)
(52) U.S. Cl. .......................................... 165/10; 126/400
(58) Field of Classification Search .................... 165/10, 165/165, 166, 167; 126/400
 See application file for complete search history.

(56) References Cited

U.S. PATENT DOCUMENTS

| | | | | |
|---|---|---|---|---|
| 1,867,163 A * | 7/1932 | Loebell | .......................... | 165/161 |
| 3,743,782 A * | 7/1973 | Laing | .............................. | 392/346 |
| 4,170,261 A * | 10/1979 | Laing et al. | ....................... | 165/10 |
| 4,270,523 A * | 6/1981 | van Heel | ........................ | 126/619 |
| 4,341,262 A | 7/1982 | Alspaugh | | |
| 4,362,207 A * | 12/1982 | Farfaletti-Casali et al. | .... | 165/10 |
| 4,545,364 A | 10/1985 | Maloney | | |
| 5,005,368 A * | 4/1991 | MacCracken et al. | .......... | 62/139 |
| 5,142,884 A | 9/1992 | Scaringe et al. | | |
| 5,239,839 A * | 8/1993 | James | .............................. | 62/434 |
| 5,497,629 A | 3/1996 | Rafalovich et al. | | |
| 6,116,330 A | 9/2000 | Salyer | | |
| 6,959,492 B1 | 11/2005 | Matsumoto et al. | | |
| 7,032,398 B2 | 4/2006 | Dilk et al. | | |
| 7,032,654 B2 | 4/2006 | Wand et al. | | |
| 7,191,820 B2 | 3/2007 | Chou et al. | | |
| 7,222,659 B2 * | 5/2007 | Levin | ............................... | 165/10 |
| 7,793,651 B2 * | 9/2010 | Sawada et al. | ................. | 126/400 |
| 7,854,131 B2 | 12/2010 | Ullman et al. | | |
| 2006/0196632 A1 * | 9/2006 | Kudo | ............................... | 165/10 |
| 2007/0284095 A1 * | 12/2007 | Wang et al. | .................... | 165/166 |
| 2010/0000707 A1 * | 1/2010 | Tsubone et al. | ................. | 165/10 |

* cited by examiner

*Primary Examiner* — Allen J Flanigan
(74) *Attorney, Agent, or Firm* — Robert Desmond, Esq.

(57) ABSTRACT

A two fluid thermal storage device that may allow for independent heating and cooling includes a plurality of plate members with a set of dividers brazed between two of them. The set of dividers, which may define a series of passageways therein, may include a first sub-series of alternate passageways filled with a phase change material, and a second sub-series of remaining passageways that transports a fluid, the remaining passageways alternating between transporting a cooling fluid through a first fluid circuit and transporting a heating fluid through a second and independent fluid circuit. The remaining passageways that transport the cooling fluid through the first fluid circuit are defined by a first subset of dividers and the remaining passageways that transport the heating fluid through the second fluid circuit are defined by a second subset of dividers.

7 Claims, 5 Drawing Sheets

TWO FLUID THERMAL STORAGE DEVICE TO ALLOW FOR INDEPENDENT HEATING AND COOLING

BACKGROUND OF THE INVENTION

The present invention generally relates to apparatus and methods for thermal storage devices and, more particularly, to apparatus and methods of thermal storage devices having independent heating and cooling circuits within the device.

Thermal storage devices are necessary because when a machine, for example a laser, generates a high load of heat over a short duration, a cooling fluid forming part of a heat exchanger adjacent the machine may not be able to absorb the heat at the same rate as the heat being generated by the heat source. Typical thermal storage devices are phase change materials ("PCM") which absorb heat energy from their surroundings as they melt from solid to liquid state and then transmit heat energy to their surroundings as they re-solidify.

Typical prior art heat exchangers employ PCM as an intermediary thermal storage devices by having a loop of fluid operating at times in heat mode and at times in cooling mode. When the heat source, for example a laser, is on, the loop is in a heat generating mode and the transport fluid picks up heat energy from the heat source, the fluid transmits heat to an adjacent fluid as part of a heat exchanger and transmits the remaining heat energy to a PCM which stores the remaining heat energy. In this example, when the laser is off, the fluid loop is then in cooling mode and the fluid runs through the same cooling loop and then into the PCM, re-absorbing some of the heat energy from the PCM, cooling the PCM as the PCM re-solidifies.

Heat exchangers and thermal storage devices may be used on aircraft where the space, weight and other limitations dictate design choices for various parts of the system, i.e. the material usable for piping in a heat exchanger, to take one example. With the continued usage of PCM in various thermal devices in increasingly more complex systems, it is useful to configure the PCM thermal storage device to allow it to have more design options to handle the diverse requirements of such systems.

As can be seen, there is a need for an apparatus and method of heat storage that has enough design flexibility to handle the diverse requirements of the heat source and of the cooling system.

SUMMARY OF THE PRESENT INVENTION

In one aspect of the present invention, there is presented a thermal storage device, comprising: a plurality of plate members; a series of passageways between the plate members including a first passageway, a third passageway, a fifth passageway and a seventh passageway that are filled with a phase change material, the series of passageways also including a sub-series of remaining passageways that transports a fluid, wherein the remaining passageways alternate between transporting a heating fluid through a first fluid circuit and transporting a cooling fluid through a second and independent fluid circuit, and a set of dividers between two of the plurality of plate members, the set of dividers defining a series of subpassageways within each passageway.

In a further aspect of the invention, there is presented a method of temporarily storing heat energy, comprising: running a first fluid through a transient heat source at a time when the heat source is generating heat; directing the first fluid through a first flow passageway adjacent to a phase change material to transfer heat to the phase change material, the first flow passageway having physical characteristics determined at least in part by requirements of the transient heat source; directing a cooling fluid through a second flow passageway adjacent to a phase change material such that the second flow passageway does not communicate with the first flow passageway, the second flow passageway having physical characteristics determined at least in part by requirements of a cooling source; and exposing the cooling fluid to the cooling source before or after the cooling fluid passes alongside the phase change material.

In another aspect of the invention, there is presented a two-fluid thermal storage device, comprising: a phase change material; a first fluid circuit in which a first fluid stream passes through a transient heat source that is generating heat, and in which the first fluid stream is directed past a first side of the phase change material; and a second fluid circuit in which a second fluid stream passes through the transient heat source when the machine is not generating heat and is thereafter directed past a second side of the phase change material, wherein the first fluid circuit and the second fluid circuit are independent so that the first fluid stream and the second fluid stream are not in immediate contact with one another, and the phase change material is located in a buffer passage between the first and second fluid circuits.

These and other features, aspects and advantages of the present invention will become better understood with reference to the following drawings, descriptions and claims.

DETAILED DESCRIPTION OF THE INVENTION

Figure 1:
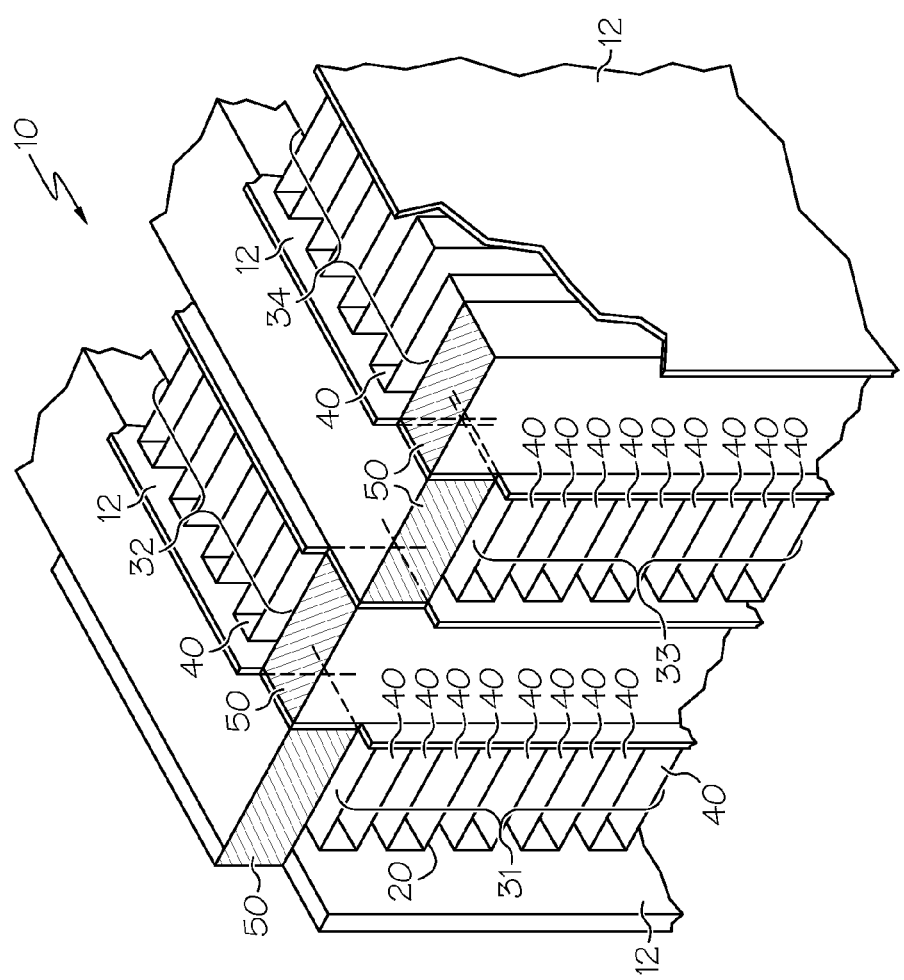
FIG. 1 is a partially cut perspective view of a plate fin thermal storage device with its housing partially cut away, in accordance with the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a thermal storage device using phase change material to temporarily store heat generated by a transient heat source such as a laser or other machine that generates large amounts of heat during intermittent use. The thermal storage device may be of plate-fin construction having a set of fins defining a series of passageways that includes a first sub-series of alternate passageways filled with phase change material and a second sub-series of remaining passageways that alternate between transporting a fluid that cools the PCM and transporting a fluid that heats the PCM. The loop within which the fluid that heats the PCM travels (heating fluid circuit) is independent of the loop within which the fluid that cools the PCM travels (cooling fluid circuit).

In contrast to the prior art, which uses a single fluid circuit that at times functions in heating mode and at times functions in cooling mode in relation to the phase change material, the thermal storage device of the present invention utilizes two separate fluid circuits, one for heating the phase change material and one for cooling the phase change material. However, each of these fluid circuits are in close contact with the PCM, allowing for efficient transfer of energy. In further contrast to the prior art wherein the fluid used during cooling mode must be the same as the fluid used during heating mode, since there is but one fluid circuit, the thermal storage device of the present invention allows greater design options by allowing for different fluids to be used for the two different fluid circuits—heating and cooling. This may permit the choice of the cooling fluid to be driven or constrained by whatever cooling mechanism is available (and by the requirements of the cooling fluid) and the choice of the heating fluid to be driven by the requirements of the transient heat source (and by the requirements of the heating fluid). A laser, for example, may require de-ionized water with high purity for the heating fluid circuit, which is a fluid that may freeze if used in the cooling cycle or be incompatible with the material of a plate fin, i.e. aluminum, since it attacks it. This problem may be alleviated by the two fluid system of the present invention. In further contrast to the prior art, wherein the single fluid circuit in the thermal storage device may not allow customization of the fin count, fin type, fin height, fin offset and/or fin thickness, with the greater design options available in the thermal storage device of the present invention, these parameters may be customized and may be set to different values for each of the fluid circuits (heating and cooling) to achieve better transient response performance, i.e. better heat transfer characteristics.

Figure 2:
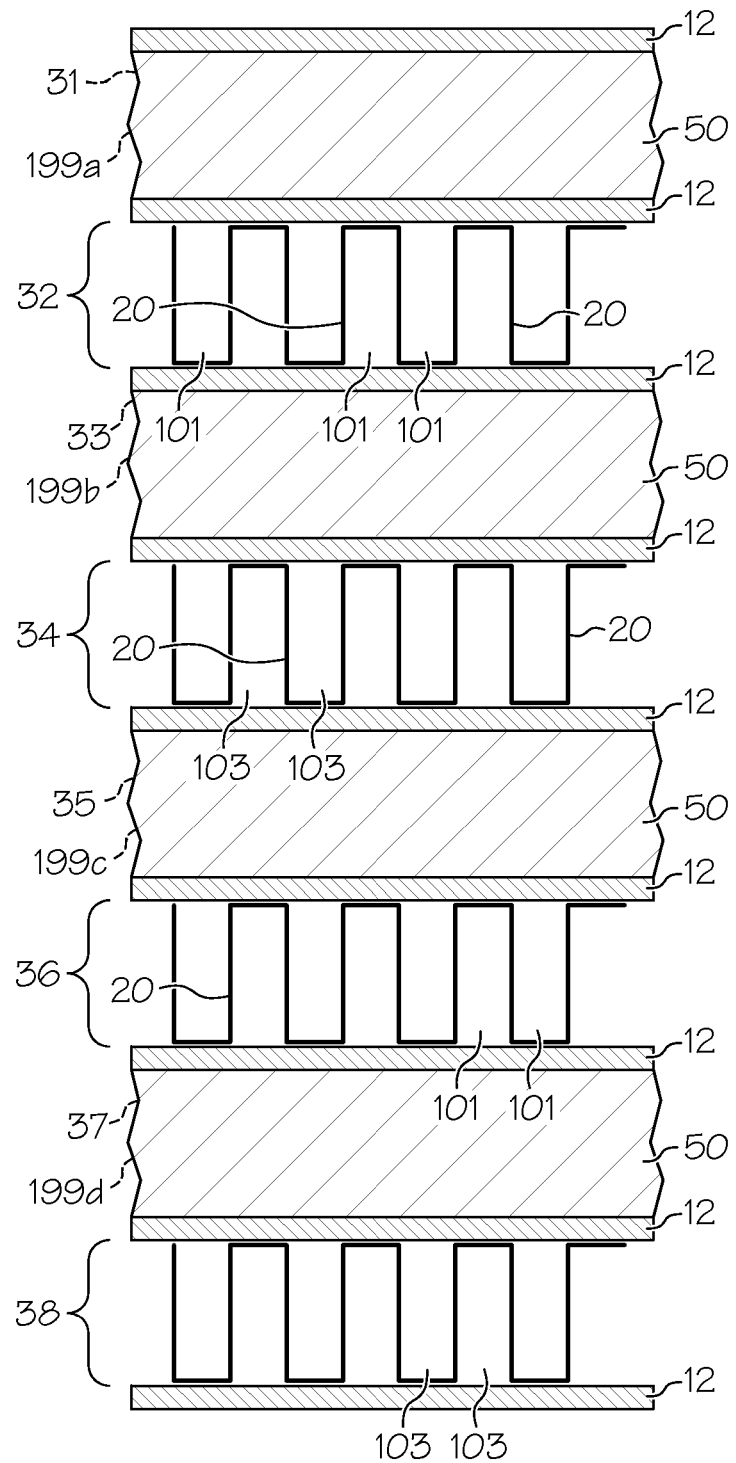
FIG. 2 is a top view of a series of eight passageways in a thermal storage device of the present invention of plate-fin construction.

As seen from FIG. 1, a thermal storage device of the present invention may utilize a plate fin heat exchanger-type construction 10 containing a plurality of plate members 12. Plate fin heat exchangers, as seen from FIG. 1, also may contain solid bars 50 positioned at the end of a plate member 12. A set of dividers, such as fins 20, may be placed, such as by brazing, between two of the plurality of plate members 12. The set of fins 20 may define a series of subpassageways 40 between fins 20. FIG. 1 is intended to show that heating and cooling fluid run in opposition to one another, otherwise known as a counterflow arrangement. Thermal storage device 10, may of course also have the heating and cooling fluids arranged in other configurations, such as a cross flow configuration or a multipass configuration. Moreover, although plate fin thermal storage device 10 of FIG. 1 depicts four separate passageways 30, namely passageways 31, 32, 33, 34, the pattern of the passageways in the present invention is more fully appreciated by showing at least eight such passageways in series. For example, FIG. 2 shows a top view of eight passageways, the first four of which may be those passageways depicted in FIG. 1. Furthermore, although eight subpassageways 30 are shown in each of the four series of passageways in the thermal storage device 10 of FIG. 1, it can be appreciated that the number of subpassageways 30 may vary and in fact may be greater or less than eight, depending upon the design requirements and resulting size of the thermal storage device.

As seen from FIG. 2, a phase change material ("PCM") 199 may be located in alternate passageways of the series of passageways 30. For example, a phase change material 199 may be located in first passageway 31, a third passageway 33, a fifth passageway 35 and a seventh passageway 37. It is noted that in FIG. 2, which is a top view, solid bar 50 sits on top of and blocks a view of first passageway 31, third passageway 33, fifth passageway 35 and seventh passageway 37. However, in order to appreciate the location of these passageways, a dashed or dotted line is used to indicate that these passageways would be visible if not for solid bars 50. The phase change material may be a hydrocarbon having approximately twenty carbon atoms, although the number of carbon atoms in the hydrocarbon may be much fewer or much more than twenty. In addition, other PCM material may also be something other than a hydrocarbon, for example a hydrated salts.

The series of passageways 30 may of course extend well beyond eight passageways and may include less than eight passageways, although the full pattern of the passageways of the present invention may best be appreciated with at least eight passageways in the series of passageways 30. In that example, the remaining passageways 32, 34, 36, 38 may constitute a second sub-series of passageways that are labeled "32", "34", "36", "38" in FIG. 2. The sub-series of remaining passageways may itself alternate between transporting cooling fluid 103 and transporting heating fluid 101. The terms "cooling fluid" and "heating fluid" refer to the effect of these fluids upon the phase change material 199. Accordingly, in this example, passageways transporting cooling fluid 103 may include those labeled "34" and "38" while passageways transporting heating fluid 101 may include those labeled "32" and "36".

Figure 3:
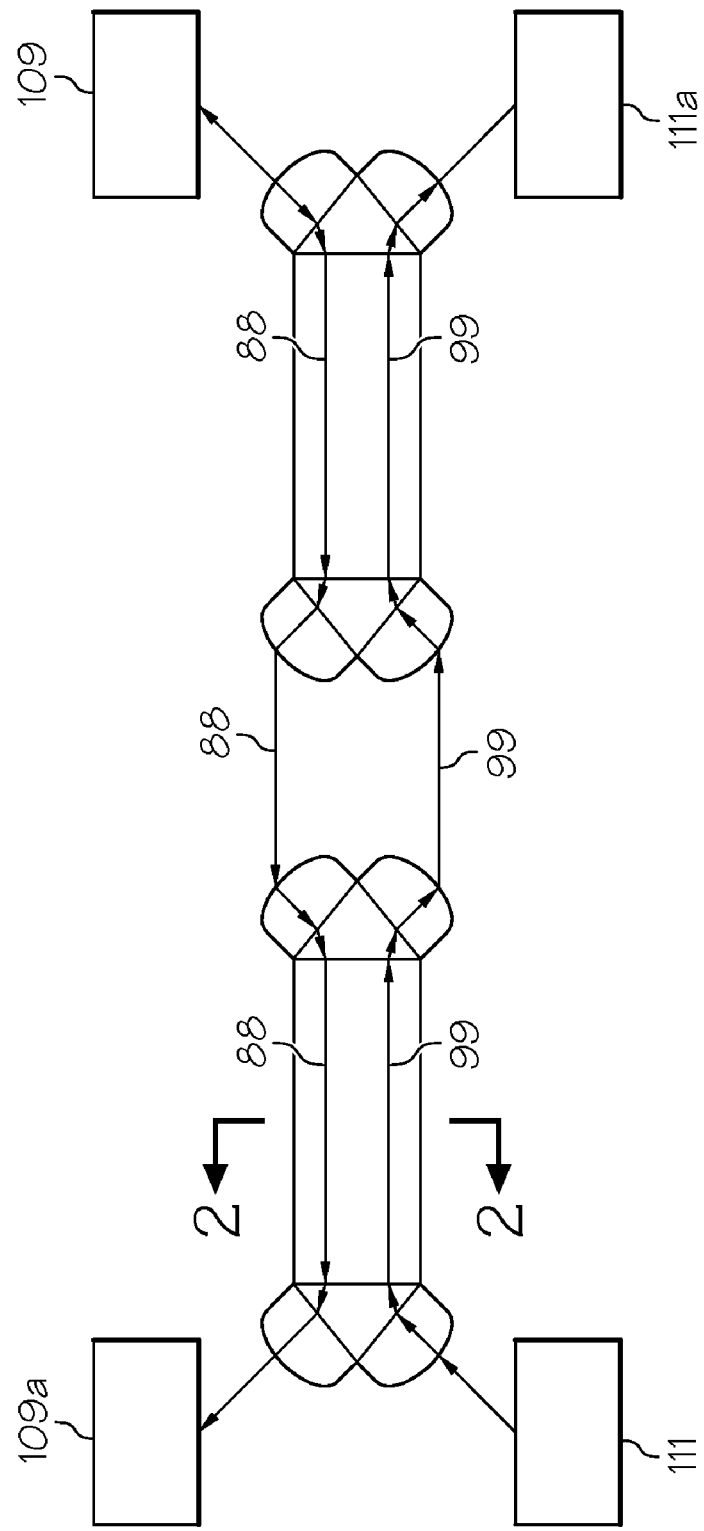
FIG. 3 is a schematic of a counterflow configuration for a PCM thermal storage device of the present invention of the type shown in FIG. 2.

As seen from FIG. 2 and from FIG. 3, a heating fluid 101 may therefore be said to operate within a first fluid circuit 88 and a cooling fluid 103 may be said to operate within a second fluid circuit 99. As seen from FIG. 2 and FIG. 3, it should be appreciated that the first fluid circuit 88 and the second fluid circuit 99 may be independent of one another. First fluid circuit 88 and second fluid circuit 99 may not flow one into the other. It should be appreciated that the first fluid circuit 88 and the second fluid circuit 99 may be operating at the same time or they may be operating at different times. As shown in a counterflow configuration in FIG. 3, heating fluid 101 may be transported from heat source 109 until it exits at heating fluid exit 109a whereas cooling fluid 103 may be transported from cooling source 111 until it exits at cooling fluid exit 111a. Note that FIG. 3 is shaped as two separate units (shown as a bog bone) with an intervening space that may be due to space limitations on aircraft that forces a heat storage system and components to be installed in multiple parts. This modular design allows for efficient packaging within space confined envelopes often found in aviation designs. As seen from the section cut line 2-2 of FIG. 3, FIG. 2 is a cross-sectional view obtained by cutting one of the units of FIG. 3 in half vertically up through the page.

Figure 5:
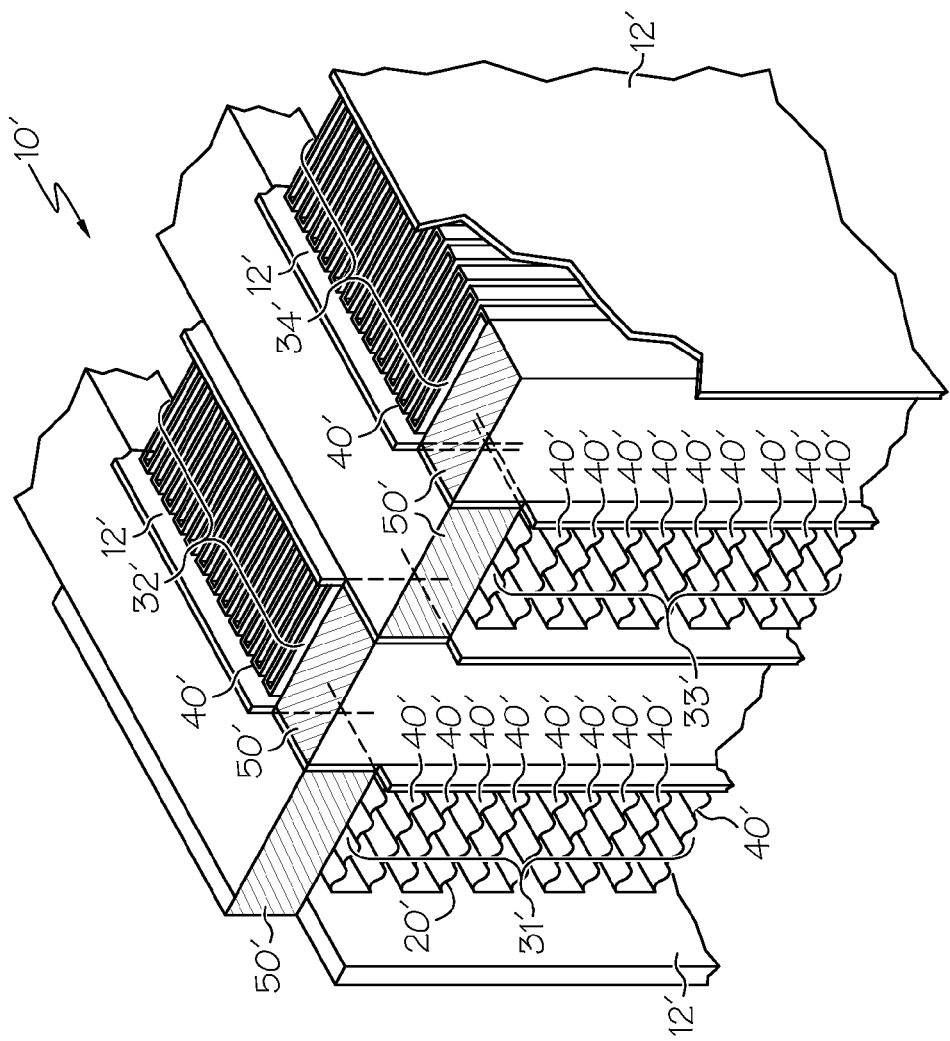
FIG. 5 is a partially cut perspective view of a plate fin thermal storage device with its housing partially cut away, in accordance with an alternate embodiment the present invention.

Accordingly, dividers 20 of the first fluid circuit 88 (first flow passageway) may have a different set of physical characteristics than those of the second fluid circuit 99 (second flow passageway). For example, as illustrated in FIG. 5 the fin count, fin type, fin height, fin thickness and/or fin offset of fins 20 may be set to different values for the first fluid circuit 88 as compared to the fins 20 in the second fluid circuit 99. The identity of the fluid running through the first fluid circuit 88 may also differ from the identity of the fluid running through the second fluid circuit 99.

It should be understood that "fin count" refers to the number of fins per inch crosswise (perpendicular to fin height and to normal fluid flow). "Fin thickness" refers to the thickness of the wall structure running between plate members 12. "Fin height" refers to the distance from one plate member 12 to the next plate member 12. "Fin type" refers to the geometry of the fin 20 (i.e. wavy, plain, offset, triangular, etc.). "Fin offset" refers to the magnitude of the distance between one offset of a fin 20 and the next offset of a fin 20 in flow length when the type of fins 20 utilized are offset fins.

Each module of phase change material 199 may be attached to or adjacent a coolant passageway as well as to a heating passageway, with the phase change material 199 acting as a buffer between them. Accordingly, as seen from FIG. 2, if heating fluid 101 passes alongside a first side of a particular module (i.e. 199a, 199b, 199c, 199d, etc. of phase change material 199, then cooling fluid 103 may pass alongside a second side of the same module phase change material 199. Likewise, phase change material 199 may be said to be in a buffer passage between cooling circuit 99 and heating circuit 88. Therefore the PCM is immediately next to each passage of the cooling circuit 99 as well as to the heating circuit 88.

It is noted that while the thermal circuit, which may serve to pick up thermal energy from a transient heat source 109, has been designated the first fluid circuit 88, the thermal circuit may in fact be considered either the first fluid circuit 88 or the second fluid circuit 99. Likewise, either the first fluid circuit 88 or second fluid circuit 99 may be designated for the cooling transport loop that may cool phase change material 199 and serve as the ultimate heat sink, although herein the cooling transport loop has been labeled the second fluid circuit 99.

As seen from FIG. 1, a first series of passageways (which may contain phase change material 199) may include a first passageway 31, a third passageway 33, a fifth passageway 35 and a seventh passageway 37. Those remaining passageways that transport cooling fluid 103 may include fourth passageway 34 and eighth passageway 38, and those remaining passageways that transport the heating fluid 101 may include second passageway 32 and sixth passageway 36. This designation of the heating and cooling passageways could also, consistent with the present invention, have been that a first, third, fifth and seventh passageways 31, 33, 35, 37 contain PCM 199 and that the remaining passageways that transport the heating fluid 101 may be fourth passageway 34 and eighth passageway 38, whereas the remaining passageways that transport the cooling fluid 103 may be second passageway 32 and sixth passageway 36.

Cooling source 111, see FIG. 3, may be a vapor cycle, a cooling reservoir, a ram air heat exchanger, or an environmental control system, or any other mechanism that allows one to deflect heat to an independent sink. Cooling source 111 may dictate the physical characteristics (i.e. fin count, fin offset, fin thickness, fin height, fin type, etc.) of the second fluid circuit 99 that transports cooling fluid as well as the identity or type of fluid transported therein (water, pure water, fuel, transport fluid, etc.). In contrast, the transient heat source 109 may dictate the physical characteristics of first fluid circuit 88 that transports heating fluid as well as the identity or type of fluid transported therein.

Figure 4:
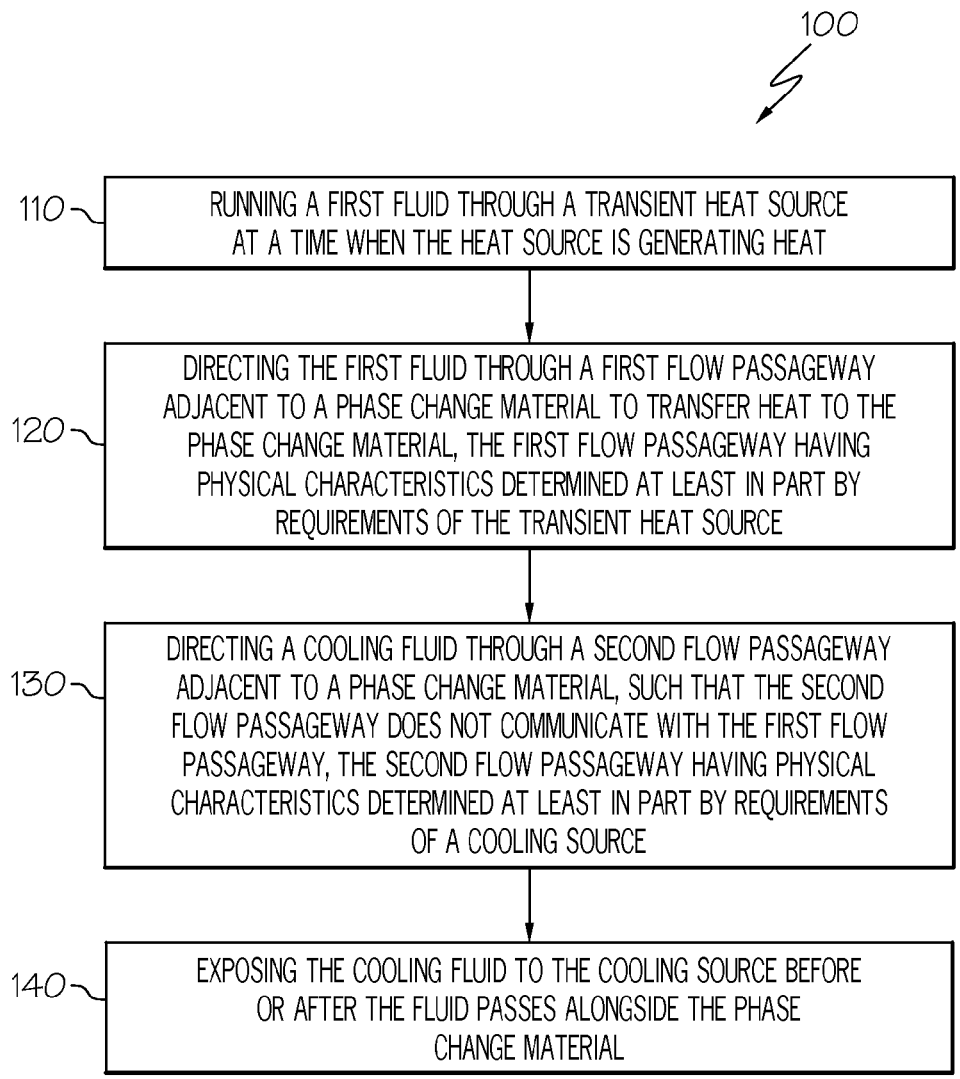
FIG. 4 is a flow chart showing a method of the present invention.

As can be seen from FIG. 4, which is a flow chart, the present invention can also be expressed as an improved method 100 of temporarily storing heat energy. Method 100 may include a step 110 of running a first fluid through a transient heat source 109 at a time when heat source 109 is generating heat. Method 100 may also include step 120 of directing the first fluid through a first flow passageway adjacent to a phase change material to transfer heat to the phase change material. The first flow passageway may have physical characteristics determined by the requirements of transient heat source 109. Method 100 may further include a step 130 of directing a cooling fluid through a second flow passageway adjacent to the phase change material. The second flow passageway does not communicate with the first flow passageway and may have physical characteristic determined by the requirements of a cooling source. Finally, method 100 may include a further step 140 of exposing the cooling fluid to a cooling source before or after cooling fluid passes alongside phase change material.

The method 100 of the present invention may direct cooling fluid 103 through the transient heat source when the machine is not generating heat (prior to being directed adjacent phase change material 199) or it may direct cooling fluid 103 to a heat sink and completely bypass the transient heat source.

Method 100 may further comprise running a first fluid through an independent heat exchanger prior to or after directing the first fluid (heating fluid) through the first flow passageway. Method 100 may also further comprise running a cooling fluid through an independent heat exchanger prior to directing the cooling fluid into a phase change material. In method 100, the cooling fluid may also be exposed to a cooling source before being directed alongside the phase change material. Likewise, the cooling fluid may be exposed to the cooling source after being directed alongside the phase change material.

It should be understood, of course, that the foregoing relates to exemplary embodiments of the invention and that modifications may be made without departing from the spirit and scope of the invention as set forth in the following claims.

I claim:

1. A thermal storage device, comprising:
    a plurality of solid, planar plate members separated by solid bars, the solid bars being disposed at opposing ends of a series of passageways formed between adjacent ones of the plate members, said series of passageways including a first plurality of passageways and a second plurality of passageways;
    a phase change material disposed in the first plurality of passageways;
    a first fluid circuit adapted to transport a heating fluid therethrough;
    a second, independent fluid circuit adapted to transport a cooling fluid therethrough, wherein the first fluid circuit and the second fluid circuit define the second plurality of passageways; and
    a set of dividers between two of the plurality of plate members, the set of dividers defining a series of subpassageways within each passageway, the set of dividers being disposed between the solid bars.

2. The heat exchanger of claim 1, wherein a first pair of the second plurality of passageways transport the cooling fluid and a second pair of the second plurality of passageways transport the heating fluid.

3. The heat exchanger of claim 1, wherein a first pair of the second plurality of passageways transport the heating fluid and a second pair of the second plurality of passageways transport the cooling fluid.

4. The heat exchanger of claim 1, wherein the dividers that transport the heating fluid are of a different geometry than the dividers that transport the cooling fluid.

5. The heat exchanger of claim 1, wherein the dividers that transport the heating fluid have a different fin count than do the dividers that transport the cooling fluid.

6. The heat exchanger of claim 1, wherein the dividers that transport the heating fluid and the dividers that transport the cooling fluid have different thicknesses.

7. The heat exchanger of claim 1, wherein the dividers that transport the heating fluid and the dividers that transport the cooling fluid have different heights.

* * * * *